(12) United States Patent
Coronato et al.

(10) Patent No.: US 6,377,352 B1
(45) Date of Patent: Apr. 23, 2002

(54) ANGULAR RATE AND REACTION TORQUE ASSEMBLY

(75) Inventors: Patrick Coronato, Belleville; Joseph Pona, Bayonne, both of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/490,429

(22) Filed: Jan. 24, 2000

Related U.S. Application Data

(60) Provisional application No. 60/124,849, filed on Mar. 17, 1999.

(51) Int. Cl.[7] ............................................... G01C 19/64

(52) U.S. Cl. ...................................... 356/460; 244/165

(58) Field of Search ........................... 356/460; 244/165, 244/170, 171; 74/5.22

(56) References Cited

U.S. PATENT DOCUMENTS

| | | | |
|---|---|---|---|
| 4,728,062 A | * | 3/1988 | Hubert ........................ 244/165 |
| 5,794,892 A | * | 8/1998 | Salvatore .................... 244/165 |
| 5,873,285 A | | 2/1999 | Barnes |
| 5,875,676 A | | 3/1999 | Bailey et al. |

* cited by examiner

*Primary Examiner*—Samuel A. Turner
(74) *Attorney, Agent, or Firm*—Loria B. Yeadon

(57) ABSTRACT

A device for both sensing an angular rate of an object and applying an angular rotation torque to the object. The device includes a rate sensing mechanism, such as a fiber optic gyroscope, which senses the angular rate of the object. The device also includes a reaction/momentum wheel mechanism, including a flywheel, for applying the angular rotation torque to the object. The rate sensing mechanism is contained within the reaction/momentum wheel mechanism or attached thereto such that the input axis of the rate sensing mechanism is coaxial with the spin axis of the reaction/momentum wheel mechanism.

9 Claims, 5 Drawing Sheets

ANGULAR RATE AND REACTION TORQUE ASSEMBLY

CROSS-REFERENCE TO RELATED APPLICATIONS

This application claims the benefit of U.S. Provisional Application No. 60/124,849, filed on Mar. 17, 1999.

BACKGROUND

1. Field of the Invention

The present invention relates to an apparatus that senses angular rate and provides reaction torque, and more particularly to an apparatus that senses angular rate and provides reaction torque about the same axis.

2. Background of the Invention

FIG. 1 shows a conventional fiber optic gyroscope 10. The fiber optic gyroscope includes a light source 12, a coupler 14, a polarizer 16 (and sometimes one or more depolarizers), a beam splitter 18, a coil of optical fiber 20, and a detector 22. Light from the light source 12 is split by the beam splitter 18 into two phase matched waves that are fed into opposite ends of the coil of optical fiber 20.

Electronics 28 at the detector measure the phase relationship between the two counter-rotating light waves by examining the interference pattern generated at the confluence. The difference in phase shifts experienced by the two beams provides a measure of the rate of rotation of the platform to which the instrument is fixed. For this reason, a fiber optic gyroscope is considered a rate gyroscope.

Fiber optic gyroscopes can be used to sense the rate of rotation of whatever object to which they are attached. These objects can range from underwater vehicles to land and air based vehicles and finally assorted spacecraft, including satellites, deep space probes, and space stations like Skylab and the International Space Station Freedom. However, a fiber optic rate gyroscope will only sense rotations about a single axis that is perpendicular to the plane of the fiber coil and intersects the center of the circle described by the fiber coil.

Typically, satellites require three orthogonal axes of rate knowledge in order to determine how their attitude, or orientation, is changing with time. For this reason, at least three rate gyroscopes are usually packaged together within a single housing. FIG. 2 shows an example of three rate gyroscopes 10 being packaged into a single housing.

If the sensing axes of the gyroscopes 10 are appropriately skewed in three dimensional space, the rates that they sense can be resolved into any arbitrary set of three orthogonal vectors which fully define the variation in the attitude of the spacecraft. This package of at least three appropriately skewed rate gyroscopes is called a rate sensor assembly, or a rate gyro assembly.

While a conventional rate sensor assembly, such as the one shown in FIG. 2, allows for the measurement of an object's angular rate, the device, and as well the gyroscopes contained within the device, still has significant drawbacks. Each of these drawbacks are discussed below.

Even though the output rates from a rate sensor assembly can be resolved into a triad of orthogonal vectors that fully define the attitude rate of the spacecraft, the accuracy of this data is directly correlated to the accuracy with which the fiber optic rate gyroscopes are aligned with respect to each other. This requirement causes significant expense at the rate sensor assembly's design and test/integration phases.

As an additional complication, this triad of orthogonal vectors can have an arbitrary orientation in inertial space. Typically, the spacecraft designer needs to align this triad of orthogonal vectors to axes on the spacecraft that have important attitude characteristics or requirements. These axes may be related to payload equipment on the spacecraft such as telescopes and antennas, or may be related to guidance and control equipment such as star trackers and reaction and momentum wheel assemblies, or may be aligned along imaginary axes where the spacecraft designer believes the minimum and maximum moments of inertia of the vehicle exist.

In any case, the alignment of the rate sensor assembly to the spacecraft must be known with extreme accuracy so that errors in attitude do not occur. This entails substantial expense at the spacecraft's design and test/integration phases.

Another problem with the rate sensor assembly shown in FIG. 2 is that the space environment in which the gyroscopes are used pose many difficulties for all types of equipment. Highly sensitive solid state devices like a fiber optic gyroscope can be affected or failed by high energy radiation that is present in space, but is filtered out by the atmosphere before it reaches the earth's surface.

Protection from radiation is dependent upon the mass of the material between the high-energy radiative particle and the circuitry of the fiber optic gyroscope. In other words, protection requires a barrier to exist between the radiation environment and the gyroscope.

The sufficiency of the barrier is related to thickness and the density of its composition. This weight is nonfunctional and, thus, the penalty imposed by this requirement reduces the weight allowable to the useful payload of the spacecraft. However, removal of the barrier would severely limit the life of the fiber optic gyroscope and, subsequently, the life of the spacecraft.

Another difficulty is that fiber optic gyroscopes 10 shown in FIGS. 1 and 2 are also sensitive to electrical supply voltage and current variations. For this reason, a rate sensor assembly consisting of a set of skewed fiber optic rate gyroscopes must be attached to electrical supply circuits on the spacecraft that are stable in voltage and noise free.

This requirement adds complexity and cost to the fiber optic gyroscope implementation. One option to eliminate this electrical supply sensitivity would be to integrate power conditioning and regulating circuitry into the rate sensor assembly. However, this would simply move the complexity and cost penalty from the spacecraft bus level down to the subsystem level. In either case, this characteristic is a detriment to the attitude determination system design of a vehicle.

And still another problem with the conventional fiber optic gyroscope 10 shown in FIGS. 1 and 2 is that the gyroscope's performance is directly proportional to the diameter of the coil of optical fiber. However, as the coil diameter increases, so must the housing that contains the set of gyroscopes grow larger.

As the housing of the rate sensor assembly becomes larger, so does the size and area of the mounting footprint. Optimally, the fiber optic rate gyroscopes are aligned orthogonally within the rate sensor assembly's housing. Because of this, the mounting footprint of the rate sensor assembly increases numerically as the square of the increase in the individual fiber optic rate gyroscope's diameter. This is a significant tradeoff, as spacecraft are designed to be as compact as possible and the mounting footprints of all componentry must be minimized.

Additionally, the volume displaced by the rate sensor assembly shown in FIG. 2 increases numerically as the cube of the increase in the individual fiber optic rate gyroscope's diameter. This is a very strong impediment to the use of large fiber optic rate gyroscopes on spacecraft and is why most sensors have maximum diameters no more than six inches. However, the miniaturization of a fiber optic gyroscope significantly reduces performance unless expensive complications are applied to the basic gyroscope design.

FIG. 3 shows a conventional reaction and momentum wheel assembly 50. The assembly 50 includes a flywheel 52 and electric motor assembly 54, among other items, that are used to provide reaction torques to a vehicle and store momentum.

In the mechanism, the flywheel 52 is mounted on rotational bearings 56, which may be ball, roller, or magnetic, that are secured to a housing 58 that is attached to the vehicle's structure.

The flywheel 52 is rotated by the electric motor assembly 54 that has a stator (nonrotating) attached to the housing, and a rotor (rotating) attached to the flywheel. Applying electricity to the motor 54 causes a torque to be developed within it and the flywheel begins to rotate. If a constant torque is generated, the flywheel accelerates at a constant rate, and the angular speed increases linearly with time.

Because every action must have an equal and opposite reaction, the torque that accelerates the flywheel 52 is also applied to the spacecraft although in an equal and opposite sense. The spacecraft will also begin to accelerate rotationally in an opposite direction at a constant rate. The ratio between the angular acceleration of the flywheel 52 and the angular acceleration of the spacecraft is proportional to the ratio of the flywheel's moment of inertia about its spin axis to the spacecraft's moment of inertia about an axis that is parallel to the flywheel's spin axis, and intersects the center of gravity of the spacecraft.

When the polarity of the drive signal applied to the flywheel's motor is reversed, the flywheel 52 will begin to decelerate as the motor provides an opposing torque. This opposing torque is also opposite to the angular rate of the spacecraft and subsequently the spacecraft begins to decelerate. By accelerating and decelerating the flywheel of these mechanisms, vehicles can be rotated into any orientation that is required.

While the conventional reaction wheel assembly 50 described above allows for the angular actuation of the object to which it is attached, the device still has significant drawbacks. Each of these drawbacks is discussed below.

The quality of the attitude control of a spacecraft depends upon many items. Some of these include the design and construction of the sensors that indicate the orientation and change in orientation of the spacecraft, the actuators that impart a change of orientation of the spacecraft, and the control system that receives the sensors' inputs, computes the appropriate actions, and commands the actuators.

In many spacecraft, the primary sensors for fine attitude control are the rate gyroscopes 10 that are bundled into a rate sensor assembly. Additionally, in many spacecraft, the primary actuators for fine attitude adjustment are reaction and momentum wheel assemblies 50, which are dispersed about the spacecraft for weight and actuation management and redundancy issues.

Because the reaction and momentum wheel assemblies are dispersed about the vehicle, it is important to carefully align their spin axes to the desired axes of influence determined within the spacecraft so that commanded torques result in the desired changes in spacecraft attitude. Errors in the alignment of the spin axes, and therefore the torque application axes, of a set of reaction or momentum wheel assemblies will result in twisting of the spacecraft away from its desired target orientation.

These types of attitude control errors can cause significant distortions and, potentially, interruptions in the functioning of the spacecraft's payload, be it antenna pointing for telecommunications, or telescope pointing for scientific, governmental, or commercial remote sensing applications. Because of the severity of these issues, substantial time, effort, and cost are spent at the subsystem and vehicle level design and assembly/integration and test phases to insure that these alignment issues are resolved.

Additionally, the reaction and momentum wheel assemblies 50 consume large amounts of electrical power. For this reason, it is not unusual for them to be connected to the unregulated and unconditioned main power lines in the satellite (which is generally referred to as the "bus"). The electric motor in these reaction and momentum wheels is of very high precision and the commutation and telemetry circuitry is carefully designed to operate within close electrical tolerances. For this reason, the unregulated and unconditioned power from the satellite bus cannot be used in its raw state because substantial variation in the operation of the reaction and momentum wheels would occur.

In order to circumvent this problem, circuitry within the reaction and momentum wheel assemblies 50 typically includes power conditioning and regulating functions that smooth out the varying voltages present on the electrical bus and prevent damage to the sensitive circuitry within the mechanisms during voltage spikes and undervoltage conditions. The output of this conditioning and regulating circuitry is stable and noise free electricity at standard operating voltages, typically 15 volts and 5 volts for a bus voltage of 28 volts.

In view of the foregoing, there currently exists a need for a device which would take advantage of the synchronicity between the applications of rate sensor assemblies utilizing fiber optic rate gyroscopes and reaction/momentum wheel assemblies in the attitude determination and control of vehicles. The device would functionally integrate a fiber optic gyroscope with a reaction/momentum wheel assembly to achieve reductions in weight, cost and complexity. The device would also improve space access.

SUMMARY OF THE INVENTION

It therefore an object of the invention to provide an improvement in the attitude determination and control of a vehicle by coaxially locating the separate functions of angular rate sensing and angular force actuation into a single apparatus.

It is a further object of the invention to provide an improvement in the alignment accuracy between the separate functions of angular rate sensing and angular force (torque) actuation.

It is a further object of the invention to provide a large diameter, high performance, fiber optic gyroscope that creates no mounting footprint or volume penalty to the spacecraft designer.

It is yet a further object of the invention to improve the ruggedness and reliability of a fiber optic gyroscope by shielding it from high-energy radiation, without imposing a weight penalty.

It is still a further object of the invention to simplify the electrical power conditioning, regulation and distribution required for the functions of angular rate sensing and angular force actuation.

It is even still a further object of the invention to simplify the cabling of a spacecraft.

In accordance with the invention, an apparatus is disclosed which contains a flywheel and electric motor system identical to a reaction/momentum wheel assembly and which also includes a large diameter, fiber optic rate sensing gyroscope aligned coaxially along the spin axis of the flywheel.

In accordance with one embodiment of the invention, a device for sensing an angular rate of an object and applying an angular rotation torque to the object is disclosed, where the device comprises: a rate sensor for sensing the angular rate of the object; and a reaction/momentum wheel for applying the angular rotation torque to the object, wherein, the rate sensor is contained within the reaction/momentum wheel assembly.

In accordance with another aspect of this embodiment of the invention, an input axis of the rate sensor is coaxial with a spin axis of the reaction/momentum wheel.

In accordance with even another aspect of this embodiment of the invention, the reaction/momentum wheel further comprises a housing; a motor assembly which is secured to the housing; a flywheel which is secured to the motor assembly; and electrical circuitry for operating the reaction/momentum wheel.

In accordance with still another aspect of this embodiment of the invention, the electrical circuitry which is used to operate the reaction/momentum wheel is further used to operate the rate sensor.

In accordance with even yet another aspect of this embodiment of the invention, the device further includes an optical device for determining the orientation of the spin and input axis.

In accordance with another embodiment of the invention, an apparatus for applying a torque and sensing a rate is disclosed, where the apparatus comprises: a flywheel, and a rate sensing gyroscope; wherein the flywheel is coaxially aligned with the rate sensing gyroscope.

In accordance with another aspect of this embodiment of the invention, the gyroscope is positioned within a cavity defined by the flywheel.

In accordance with still another aspect of this embodiment of the invention, the gyroscope is positioned beneath the flywheel.

BRIEF DESCRIPTION OF THE DRAWINGS

The accompanying drawings are included to provide an understanding of the invention and constitute a part of the specification.

DESCRIPTION OF THE INVENTION

Figure 1:
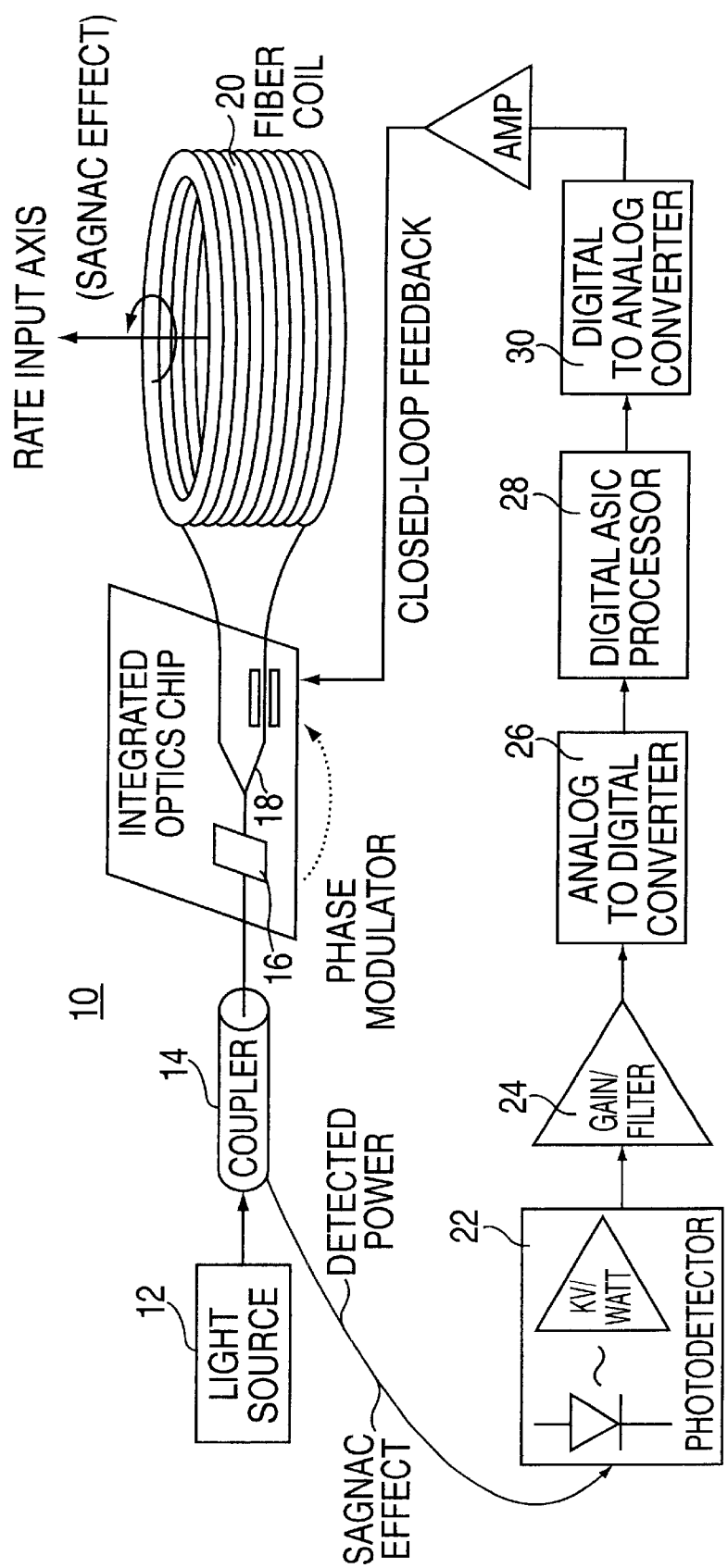
FIG. 1 illustrates a conventional prior art fiber optic gyroscope 10.
Figure 2:
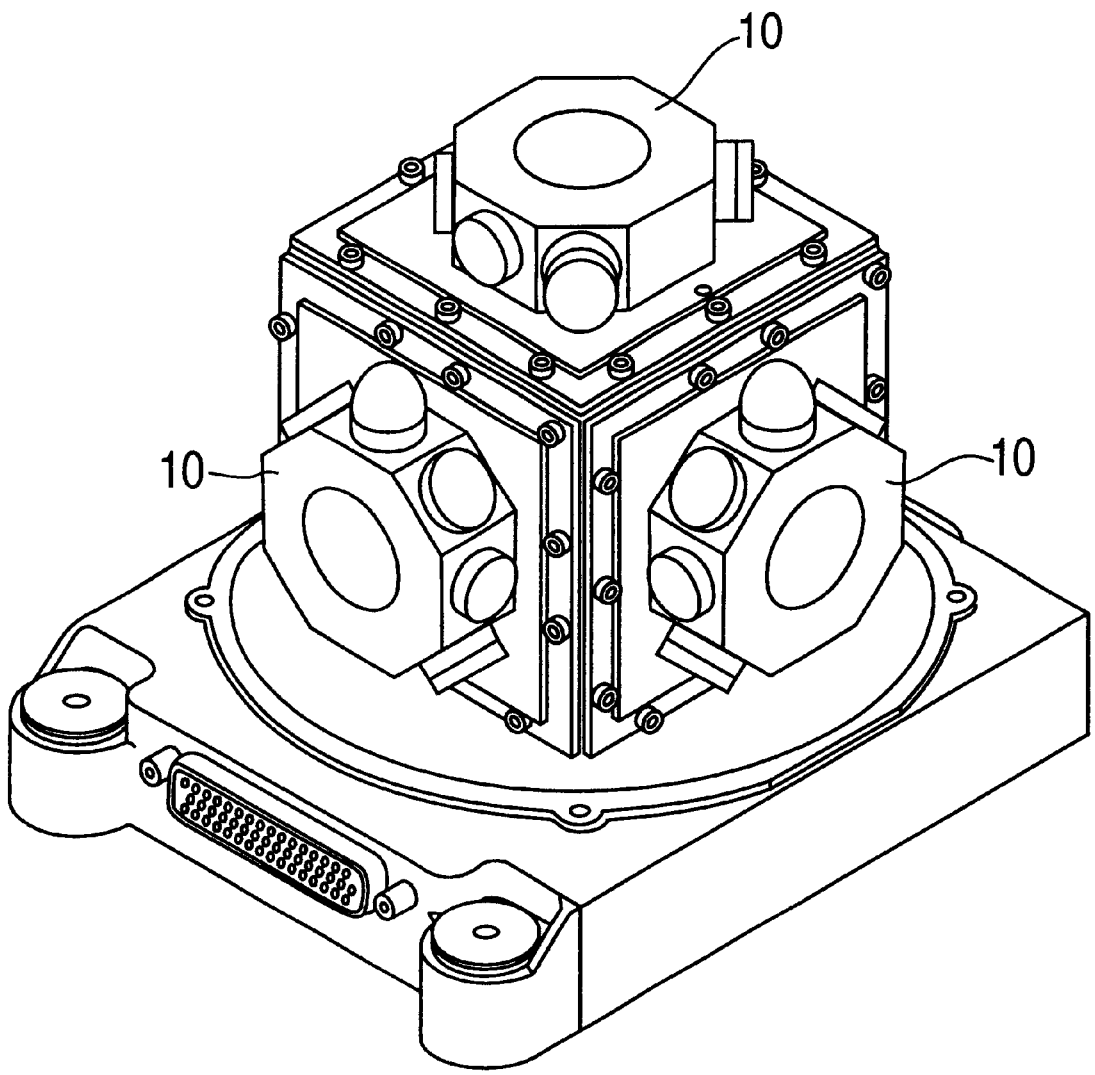
FIG. 2 illustrates an example of prior art three rate gyroscopes packaged into a single housing.
Figure 3:
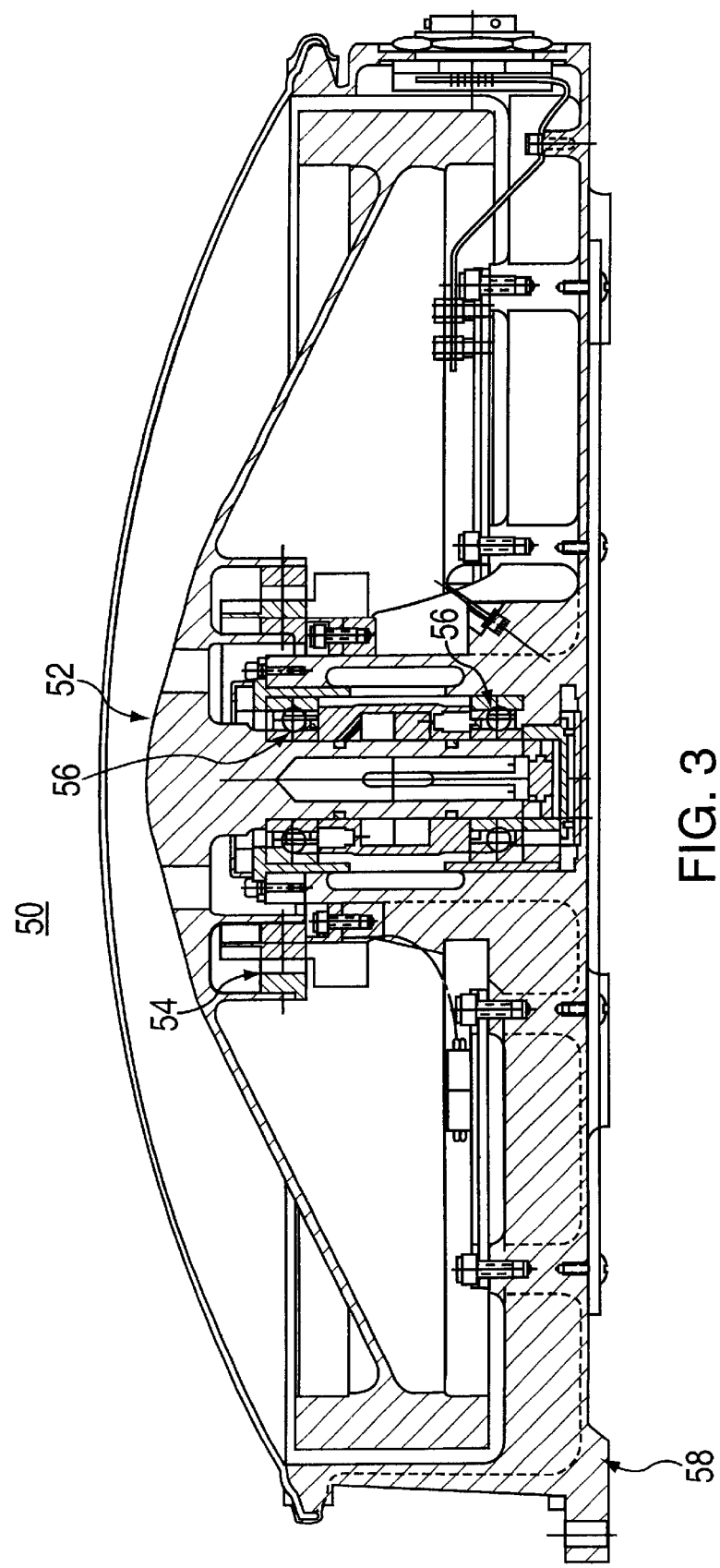
FIG. 3 depicts a cross-section view of a conventional prior art reaction and momentum assembly 50.
Figure 4:
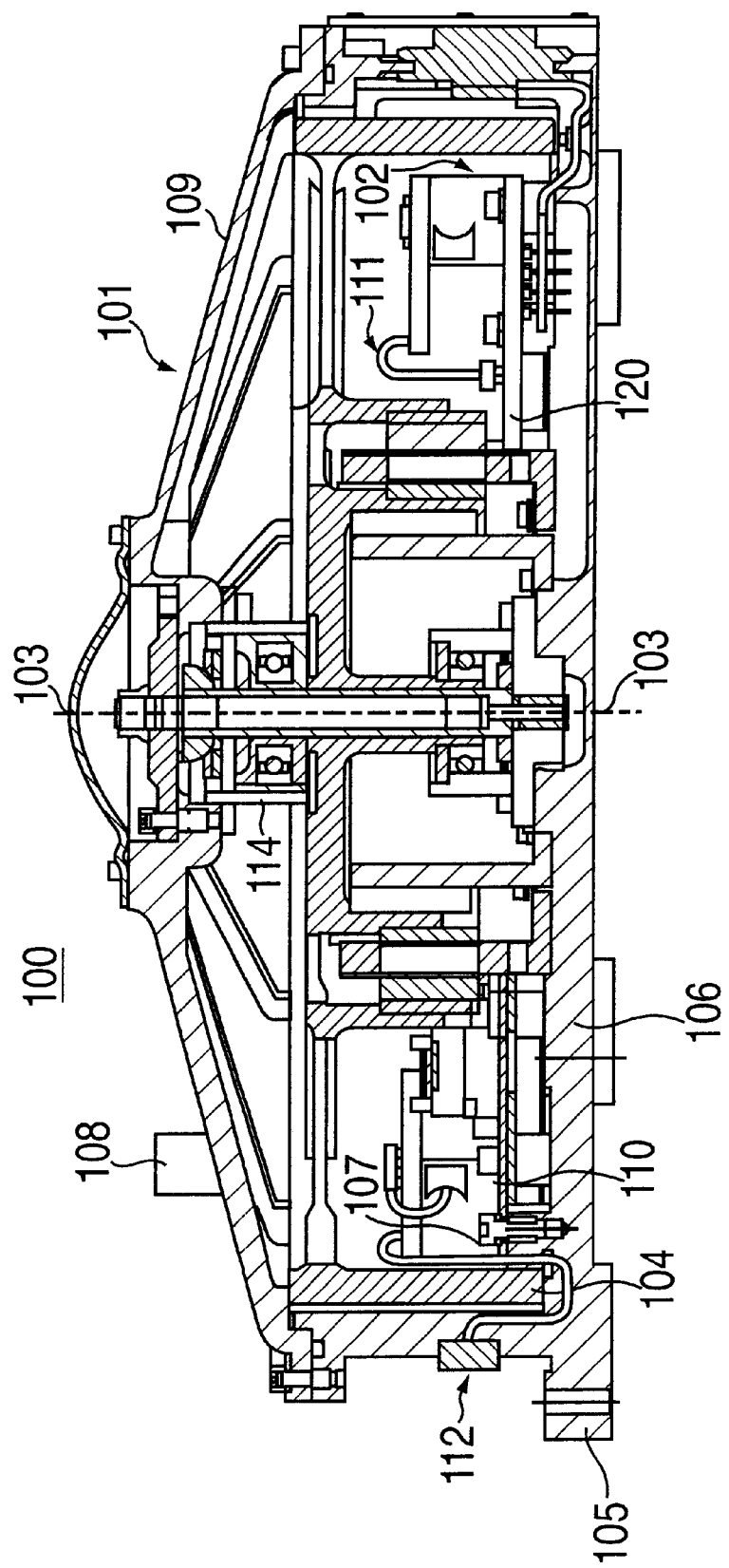
FIG. 4 depicts a cross-section view of one illustrative embodiment of an apparatus developed in accordance with the invention.
Figure 5:
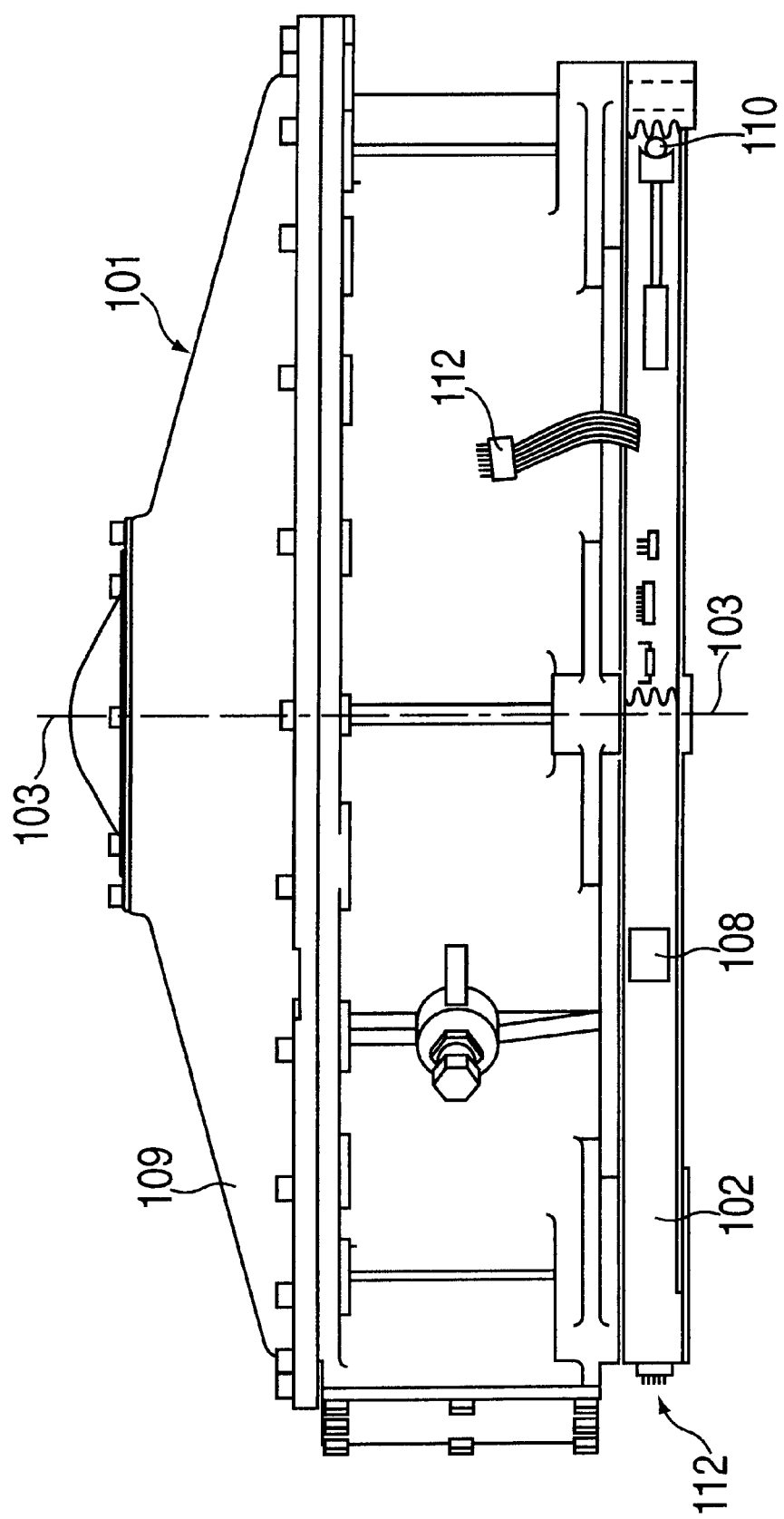
FIG. 5 depicts another illustrative embodiment of an apparatus developed in accordance with the invention.

FIGS. 4 and 5 show embodiments of an apparatus 100 in accordance with the present invention. The apparatus 100 includes a reaction/momentum wheel assembly 101 that shares an interface with (FIG. 4) or contains within it (FIG. 5) a fiber optic rate gyroscope 102; identical elements being identified by resource reference numbers in both embodiments.

An input axis 103 of the fiber optic rate gyroscope 102 is aligned so as to be coaxial with a spin axis 103 of a flywheel 104 contained within the reaction/momentum wheel assembly 101. Additionally, the input axis 103 of the fiber optic rate gyroscope is aligned so as to be perpendicular to the plane of mounting feet 105 of the apparatus 100.

Referring to FIG. 4, in this embodiment the fiber optic rate gyroscope 102 which includes the fiber optic coil 110 is attached to the housing 106 within the reaction/momentum wheel assembly 101 with the use of screws 107. Alternatively, the fiber optic gyroscope 102 could be connected by the use of adhesives or could have an external surface that contains large diameter threads which interface with the housing 106.

The alignment between the spin axis 103 of the flywheel 104 and the input axis 103 of the fiber optic rate gyroscope 102 could be effected with precision guide pins, locating holes or flats, or guide surfaces. The alignment between the mounting feet 105 of the apparatus 100 and the fiber optic rate gyroscope 102 could be accomplished similarly. Electrical connectors 112 on the exterior of the housing would provide an interface for electrical power and command signal/telemetry to the vehicle.

An optical cube or optical flat 107 could be added to the apparatus 100 to allow an even more precise method for determining the orientation of the combination spin and input axis.

In order to improve the ability of the fiber optic rate gyroscope 102 to withstand the high-energy radiation environment of space, the fiber optic rate gyroscope 102 in this embodiment is positioned within the reaction/momentum wheel assembly 101. In this way, a top cover 109 and flywheel 104 of the reaction/momentum wheel assembly 101 shield the fiber optic rate gyroscope 102.

Referring specifically to FIG. 5, which shows another embodiment of the invention, to improve the ruggedness further, the fiber optic rate gyroscope 102 in this embodiment is positioned beneath the entire reaction/momentum wheel assembly 101, the gyroscope 102 being depicted particularly in section to show the fiber optic coil 110. This adds the shielding effect of the reaction or momentum wheel's circuit card assembly 110 and housing 106 for the gyroscope 102.

Referring again to FIG. 4, the reaction wheel assembly 101 also includes a motor assembly 114. The motor assembly 114 is used to power the flywheel 104.

Electrical power conditioning and regulation circuitry 110 is also contained within the reaction/momentum wheel assembly 101 to operate the assembly. The circuitry 110 contains a pickoff connector 111 that would be attached to the fiber optic rate gyroscope 102 thus allowing the circuitry 110 to operate both the fiber optic gyroscope 102 and the reaction/momentum wheel assembly 101. Use of the circuitry 110 in this manner eliminates the duplication of the power conditioning and regulation circuitry that was required by conventional devices.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A device for both sensing an angular rate of an object and applying an angular rotation torque to the object, said device comprising:

a rate sensor sensing the angular rate of the object; and a reaction/momentum wheel assembly for applying the angular rotation torque to the object;

said rate sensor being physically attached to and shielded by said reaction/momentum wheel assembly.

2. The apparatus of claim 1, wherein said rate sensor is a fiber optic gyroscope and the input axis of said fiber optic gyroscope is coaxial with the spin axis of said reaction/momentum wheel assembly.

3. The apparatus of claim 2, wherein said fiber optic gyroscope is located within reaction/momentum wheel assembly.

4. The apparatus of claim 2, wherein said fiber optic gyroscope is positioned beneath the housing of said reaction/momentum wheel assembly.

5. The apparatus of claim 2, further comprising common electrical circuitry operating both said reaction/momentum wheel assembly and said fiber optic gyroscope.

6. The apparatus of claim 2 further including an optical means for determining the orientation of said spin and input axes.

7. An apparatus for both applying a torque and sensing a rate, said apparatus comprising:

a reaction/momentum assembly including a flywheel, and a rate sensing gyroscope which is connected to said assembly;

wherein said flywheel is coaxially aligned with said rate sensing gyroscope.

8. The apparatus of claim 6 wherein said gyroscope is positioned within a cavity defined by said assembly.

9. The apparatus of claim 6 wherein said gyroscope is positioned beneath said assembly.

* * * * *